US009221209B2

(12) United States Patent
Desoto-Burt et al.

(10) Patent No.: US 9,221,209 B2
(45) Date of Patent: Dec. 29, 2015

(54) PROCESS FOR THE MANUFACTURE OF A CONTAINER

(75) Inventors: Widalys Luz Desoto-Burt, Cincinnati, OH (US); Todd Mitchell Day, Bethel, OH (US); Ralph Edwin Neufarth, Liberty Township, OH (US); Richard Darren Satterfield, Bethel, OH (US); Chow-chi Huang, West Chester, OH (US); Miguel Alberto Herrera, Loveland, OH (US); Su-Yon McConville, Mason, OH (US); Alfredo Pagan, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 86 days.

(21) Appl. No.: 13/350,284

(22) Filed: Jan. 13, 2012

(65) Prior Publication Data
US 2012/0181209 A1    Jul. 19, 2012

Related U.S. Application Data

(60) Provisional application No. 61/433,052, filed on Jan. 14, 2011, provisional application No. 61/433,062, filed on Jan. 14, 2011, provisional application No. 61/433,068, filed on Jan. 14, 2011, provisional application No. 61/433,072, filed on Jan. 14, 2011, provisional application No. 61/433,079, filed on Jan. 14, 2011, provisional application No. 61/432,698, filed on Jan. 14, 2011.

(51) Int. Cl.
*B29C 49/04* (2006.01)
*B29C 49/54* (2006.01)
*B29C 49/00* (2006.01)
*B29C 49/06* (2006.01)
*B29C 49/12* (2006.01)

(52) U.S. Cl.
CPC ............ *B29C 49/54* (2013.01); *B29C 49/0005* (2013.01); *B29C 49/04* (2013.01); *B29C 49/06* (2013.01); *B29C 49/12* (2013.01); *B29C 2049/545* (2013.01); *B29C 2049/546* (2013.01); *B29K 2995/006* (2013.01); *Y10T 16/44* (2015.01)

(58) Field of Classification Search
None
See application file for complete search history.

(56) References Cited

U.S. PATENT DOCUMENTS

| 3,374,917 | A | | 3/1968 | Troy |
| 3,541,640 | A | * | 11/1970 | Stefaniak et al. ............. 425/136 |
| 3,765,574 | A | | 10/1973 | Urquiza |

(Continued)

FOREIGN PATENT DOCUMENTS

| BR | 9505903 A | 1/1998 |
| CH | 598931 A5 | 5/1978 |

(Continued)

OTHER PUBLICATIONS

International Search Report; PCT/US2012/021262; Date of Mailing Jul. 31, 2012; 16 pages.

(Continued)

*Primary Examiner* — Monica Huson
(74) *Attorney, Agent, or Firm* — Linda M. Sivik

(57) ABSTRACT

The present invention is directed to a process for the manufacture of a blow molded container comprising a physical geometry that creates more than one undercut and a means for removal of said container from a mold used to form said container.

6 Claims, 4 Drawing Sheets

(56) References Cited

U.S. PATENT DOCUMENTS

| | | | |
|---|---|---|---|
| 4,273,248 A | 6/1981 | Lehmann | |
| D263,805 S | 4/1982 | Seager | |
| 4,506,489 A | 3/1985 | Schieser et al. | |
| 5,051,084 A | 9/1991 | Guarriello et al. | |
| 5,209,891 A | 5/1993 | Guarriello et al. | |
| 5,364,675 A | 11/1994 | Guarriello et al. | |
| 5,503,886 A | 4/1996 | Guarriello et al. | |
| 5,505,612 A | 4/1996 | Mero et al. | |
| 5,850,950 A | 12/1998 | Hofmann | |
| 5,921,416 A | 7/1999 | Uehara | |
| 6,029,866 A | 2/2000 | Wood et al. | |
| 6,041,975 A | 3/2000 | Flak | |
| D435,793 S | 1/2001 | Kreiseder | |
| D438,114 S | 2/2001 | Stonberg | |
| D440,495 S | 4/2001 | Hathaway | |
| 6,290,094 B1 | 9/2001 | Arnold et al. | |
| 6,325,252 B1 | 12/2001 | Brozell et al. | |
| 6,416,173 B2 | 7/2002 | Kishida et al. | |
| 6,495,089 B1 * | 12/2002 | Crider | 264/531 |
| 6,811,047 B1 | 11/2004 | Hicks et al. | |
| D574,241 S | 8/2008 | Braukmann et al. | |
| D613,160 S | 4/2010 | Ablo | |
| D670,164 S | 11/2012 | Pagan et al. | |
| D672,243 S | 12/2012 | Desoto-Burt et al. | |
| 2002/0053524 A1 | 5/2002 | Alticosalian | |
| 2005/0144913 A1 | 7/2005 | Pagh | |
| 2008/0124432 A1 | 5/2008 | Ma | |
| 2008/0202966 A1 | 8/2008 | Fields et al. | |
| 2009/0045157 A1 | 2/2009 | Panchal et al. | |
| 2010/0140280 A1 | 6/2010 | Burke et al. | |
| 2010/0308043 A1 | 12/2010 | Wimmer | |
| 2012/0031548 A1 | 2/2012 | Broad | |
| 2012/0181209 A1 | 7/2012 | Desoto-Burt | |
| 2012/0181278 A1 | 7/2012 | Desoto-Burt et al. | |
| 2012/0181292 A1 | 7/2012 | Desoto-Burt | |
| 2012/0181302 A1 | 7/2012 | Desoto-Burt et al. | |

FOREIGN PATENT DOCUMENTS

| | | |
|---|---|---|
| CN | 300919834 A | 5/2009 |
| CN | 300990533 A | 8/2009 |
| CN | 301056126 A | 11/2009 |
| DE | 2542045 A1 | 3/1977 |
| DE | 8808369 U1 | 8/1988 |
| DE | 69119790 T2 | 10/1996 |
| EM | 1174874.0004 | 1/2010 |
| EP | 0437332 A | 7/1991 |
| EP | 0407976 A | 1/1992 |
| EP | 0446991 A | 9/1992 |
| EP | 0908393 A | 4/1999 |
| EP | 911272 A | 10/2000 |
| EP | 997289 A | 4/2001 |
| EP | 1115647 A1 | 7/2001 |
| EP | 1177988 | 2/2002 |
| EP | 1177988 A | 2/2004 |
| EP | 1394052 A1 | 3/2004 |
| EP | 1566359 A1 | 8/2005 |
| EP | 1826133 A1 | 8/2007 |
| EP | 1870346 A1 | 12/2007 |
| EP | 1930246 A1 | 6/2008 |
| EP | 2216253 A1 | 8/2010 |
| FR | 2752820 A1 | 3/1998 |
| GB | 2371041 A | 7/2002 |
| JP | 49115356 | 11/1974 |
| JP | 60220722 A | 11/1985 |
| JP | 07232756 | 9/1995 |
| JP | 7285167 A | 10/1995 |
| JP | 3298742 B2 | 12/1995 |
| JP | 7329132 A | 12/1995 |
| JP | 8267520 A | 10/1996 |
| JP | 9254203 A | 9/1997 |
| JP | 10071634 A | 3/1998 |
| JP | 10337772 | 12/1998 |
| JP | 11276948 A | 10/1999 |
| JP | 11342967 | 12/1999 |
| JP | 2000024769 A | 1/2000 |
| JP | 2001191373 A | 7/2001 |
| JP | 2001310335 A | 11/2001 |
| JP | 2002225908 A | 8/2002 |
| JP | 2003181908 A | 7/2003 |
| JP | 2003245957 A | 9/2003 |
| JP | 2005-178865 | 7/2005 |
| JP | 2008-545467 | 12/2008 |
| JP | 2009-525932 | 7/2009 |
| JP | 4728062 | 7/2011 |
| KR | 2008003965 A | 9/2008 |
| KR | 2010006308 A | 1/2010 |
| WO | 9010532 A1 | 9/1990 |
| WO | 03016157 A | 2/2003 |
| WO | WO2006/064683 | 6/2006 |
| WO | 2010005607 A | 1/2010 |

OTHER PUBLICATIONS

International Search Report PCT/US2012/021238; Mailing Date Mar. 23, 2012; 13 pages.

International Search Report PCT/US2012/021241; Mailing Date Apr. 26, 2012; 14 pages.

International Search Report PCT/US2012/021265; Mailing Date Mar. 22, 2012; 15 pages.

U.S. Appl. No. 13/350,336 USPTO Office Action dtd May 2, 2013.

U.S. Appl. No. 13/350,320 USPTO Office Action dtd May 15, 2013.

U.S. Appl. No. 13/350,320 USPTO Office Action dtd Jan. 4, 2013.

* cited by examiner

PROCESS FOR THE MANUFACTURE OF A CONTAINER

CROSS REFERENCE TO RELATED APPLICATION

The application claims the priority to U.S. Provisional Application Ser. No. 61/433,052, filed on Jan. 14, 2011; and U.S. Provisional Application Ser. No. 61/433,062, filed on Jan. 14, 2011; and U.S. Provisional Application Ser. No. 61/433,068, filed on Jan. 14, 2011; and U.S. Provisional Application Ser. No. 61/433,072, filed on Jan. 14, 2011; and U.S. Provisional Application Ser. No. 61/433,079, filed on Jan. 14, 2011; and U.S. Provisional Application Ser. No. 61/432,698, filed on Jan. 14, 2011, all of which are herein incorporated by reference.

FIELD OF THE INVENTION

The present invention relates to a process for blow-molding an article with a physical geometry that creates more than one undercut and a means for removal of said article from a mold being used to form said article.

BACKGROUND OF THE INVENTION

A variety of packages, including dispensing packages or containers, have been developed for household products, personal care products, and other products. Containers that have a pleasing aesthetic look to consumers have a closure design that is fully integrated with the design of the container. This conveys the message that the integration of the two components was well thought of. This is important to make closure functioning intuitive to consumers. An example of a well integrated container/closure system is one where the container's geometry wraps around the closure to create shoulders. This geometry can also be referred to as a container with a recessed neck. This recess geometry serves different purposes: overall integrated look to the container and closure, stability to container in inverted orientation, and makes functioning of closure more intuitive to consumers.

Blowing this container geometry with today's traditional blow molding technology is not possible, as the container would have undercuts in the concave portion of the shoulder. This is because when the molding cavity tools are to be opened, the steel creating the concave part becomes trapped. If one were to shape the top part using the blow pin head tool, one would then encounter an undercut under the snap bead feature that is in proximity to the container's shoulder. This is because one would not be able to pull the blow pin tooling which creates the snap bead from underneath the formed bead feature.

When looking at containers in the market that use a recess geometry design, it has been noticed that they usually have a straight shoulder vs. a concave design. The forming of that recess does not require any inventive step as there is at least one direction in which the mold can open with a straight-pull motion without yielding to any mold material becoming trapped within the container's geometry. Yet, recess geometries that can be unmolded with a straight-pull in a blow mold are highly restricted in design, limiting the integration of the closure with the blown container and therefore all the benefits stated above.

There are other containers currently in the market that have different shoulder geometries, but these containers use a different neck from what the present invention has found. These containers use a closure attachment mechanism, where the closure snaps onto the container from the inside of the dispensing orifice. A non-limiting example of a container made through the process described in the present invention can be referred to as having a snap-on closure mechanism, where the closure snaps onto the outside of the container's neck. From the present invention discovery, the present design provides more reliability against leaking, as the outside part of the neck is calibrated, providing tighter tolerances, than the inside part of the container. The inside of the container is not highly calibrated, increasing the probability of poor engagement between container and closure, and thus leading to potential leaking. This is because the parts blown via the extrusion blow molding process usually have better controlled geometry on the outside of the part rather than the inside, as the material wall thickness can vary due to part aspect ratios translating into differing parison stretch ratios in both radial and axial directions. In addition, containers whose closures attach onto the container from the inside of the neck usually require trimming and reaming of the neck as secondary operations. An operation that cuts-away excess material is inherently not cost-effective and should be avoided. Furthermore, any cutting operation requires straight access to the part that shall be cut away restricting the available recess geometry and limiting the integration of the closure with the blown container and therefore all the benefits stated above. With a closure attachment mechanism where the closure seals from the inside of the neck and snaps onto the container from the outside of the neck, a traditional striker plate and blow pin tool design can be used, where the blow pin cuts the parison when it comes in contact with the striker plate, creating a calibrated neck and therefore eliminating the need for secondary operations such as trimming and reaming.

Currently, most closures complete the geometry of the container, thereby requiring the size of the closure to be proportional to the geometry of the container. In the present invention, the size of the closure is minimized thereby providing several benefits. One of the benefits is reducing the weight of the closure to the minimum amount of resin needed to enable the required closure functionality. This is a benefit for the environment as industry currently does not have a well established polypropylene recycling stream. By having a closure that has a reduced weight from the overall package, this allows a container to have improved recyclability. It also reduces the overall costs of the closure including costs associated with resin, processing, tooling, injection mold (IM) press selection, and others. Another benefit of minimizing closure size is that the closure becomes a less focal point of the design making it more inductive to use the same closure for different container designs within one brand and even enable the use of the same closure across different brands/ shaped families. This drives optimization and efficiency and in return reduces further costs. This further enables the silhouette of the shape to be scaled proportionally without the use of additional features such as steps, larger radii or other geometric alterations and angles to accommodate the closure.

Another benefit for minimizing the closure size is that it can be integrated in the container shape. When the container is in its inverted orientation, an integrated design allows the use of the container top surface to add stability vs. requiring a larger closure. It also aids in creating differentiation between the forms (such as shampoo and conditioner), helping consumers identify the product that they are looking for. This drives scale in the container design and development and therefore is an advantage. A further advantage is that having a recessed closure provides a higher level of protection from damage due to the recessed closure being protected by the recess geometry. Another benefit of having a recessed neck where the container wraps around the closure is that it enables using the same closure across different sizes while still having an integrated look between the container and the closure. A further benefit of the present invention is the enablement of using the same closure across containers made by different molding technologies. Non-limiting examples of molding technologies include extrusion blow molding (EBM), injection blow molding (IBM), and injection stretch blow molding (ISBM). This drives scale and further reduces costs.

Although inserts moving inside molds to release undercuts are known in the industry, these are in general for parts made via the injection molding process and not via the blow molding platforms, as the present invention has found. Although moving insert components can be used inside extrusion blow molding molds, they are traditionally used to permanently deform the blown parts to create special features, such as lips or to create spaces to which appendages, such as handles are permanently attached. The present invention enables releasing undercuts created by having a recessed neck geometry, coupled with a closure attachment mechanism that is integral to the outside of the container's neck.

It is an objective of the present invention to provide a blowing process to create a recess in a blown container. Such a recess allows integration of the closure with the container such that when the closure is coupled with the blown container, it is substantially flush to the apex of the outmost surface of that blown container.

SUMMARY OF THE INVENTION

The present invention is directed towards a process for the manufacture of an article, preferably a container, that comprises a physical geometry that creates more than one undercut and a means for removal of said article from a mold being used to form said article.

DETAILED DESCRIPTION OF THE INVENTION

Figure 1A:
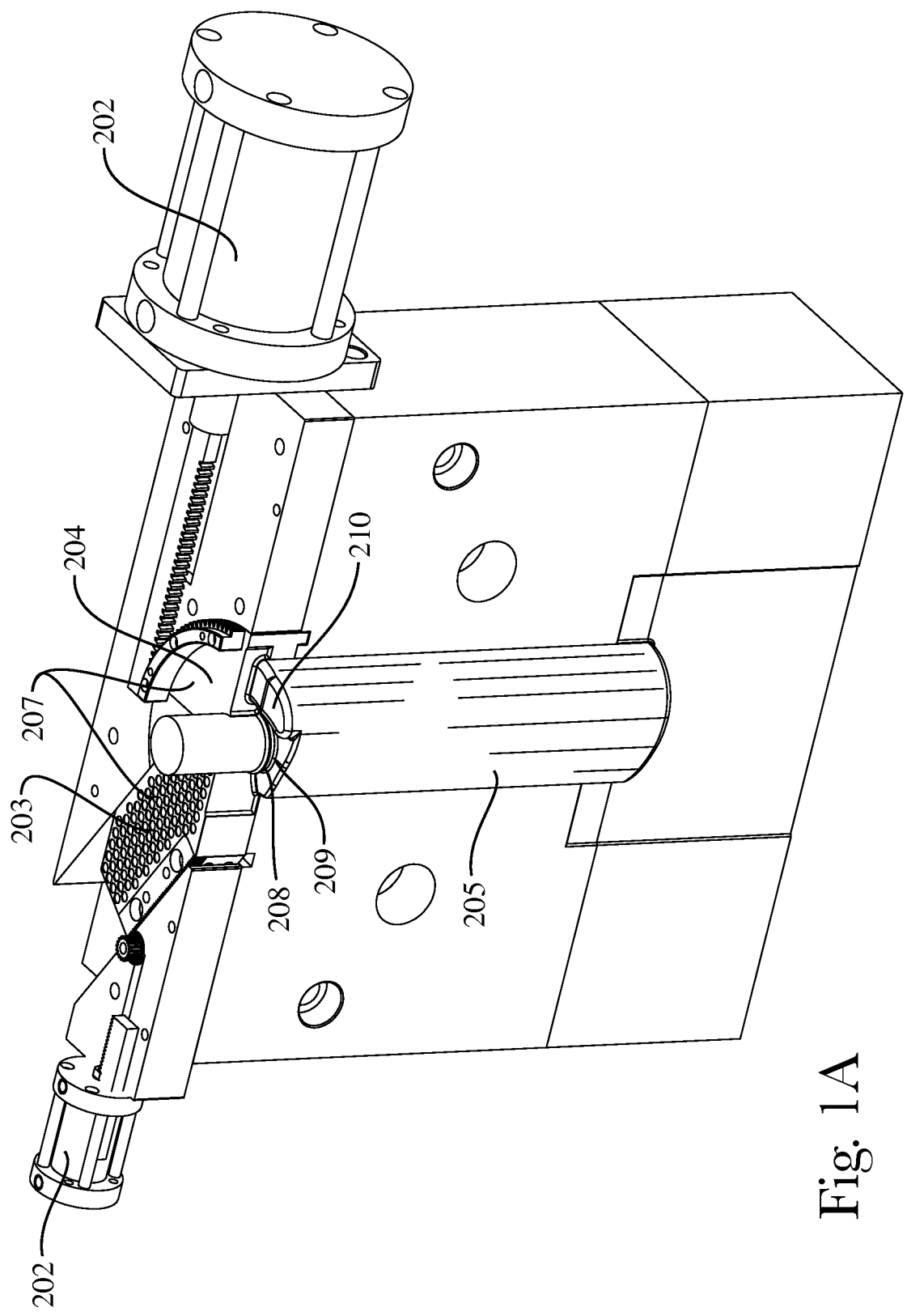
FIG. 1A is an isometric view of a mold used to form a container. This illustration shows a container inside a mold, prior to being released. The illustration also shows two moving inserts in a molding position, prior to being actuated.

For the purposes of the present invention, suitable recesses are those that permit a portion of the article to wrap around at least part of a closure, when said closure is coupled with said article. Such recess may allow the closure, when coupled to said article, to remain substantially flush to the apex of the outermost surface of said article. By "at least part of a closure" it is herein intended that said portion extends around the perimeter of the closure to form an angle of at least 45°, preferably at least 60°, more preferable between 60° and 360°, taken from the centre of the closure and in the x-y plane, when said closure is coupled to said article.

The term "integrated" as used herein intends that: (i) at least part of said closure remains substantially flush with at least one surface of the article, preferably the outer surface of said shoulder; and (ii) that at least one shoulder of said article wraps around at least part of said closure, preferably forming at least one concave surface. The advantage of such configuration being a consumer desirable silhouette.

The term "undercut" as used herein means a physical geometry that hinders article removal from a mold when said mold is opened in a linear direction which intersects at least a portion of said geometry.

The term "without damage" as used herein means that the article retains the end physical geometry generated at the end of the forming process.

The term "scale" as used herein refers to an economic benefit obtained by reducing the design and development time and resources, as well as capital investment obtained by direct reapplication without negative implications on consumer acceptance, design aesthetics, etc.

The term "preform" as used herein is a molded form which is produced prior to expansion to form the finished article. A preform is necessarily somewhat smaller than the finished blown article. A preform is generally produced by, for example injection molding, at an elevated temperature in excess of the melt temperature.

The term "stretch-blow molding" as used herein is the process in which preforms are heated above their glass transition temperature, and then blown in molds using a high pressure medium, preferably air, to form hollow articles, such as containers. Usually the preform is stretched with a stretch rod as part of the process.

Blow molding is a well known manufacturing process for the fabrication of plastic articles such as containers, fuel tanks, handles etc. The blow molding process begins with melting plastic and forming it into a parison or preform. The parison is then clamped into a mold and a pressurized medium, usually air, is blown or pumped into it. The air pressure forces the plastic to match the peripheral geometry of the mold. Once the plastic has cooled and hardened the mold opens up and the part is ejected.

There are three main types of blow molding platforms: extrusion blow molding (EBM), injection blow molding (IBM) and stretch blow molding (SBM). In some applications the combination of the abovementioned blow molding platforms may be more appropriate depending on the properties and complexity of the articles to be formed, such as injection stretch blow molding (ISBM).

Plastic resin materials for use in the present invention can be polyolefins such as polyethylene (PE) and polypropylene (PP), polystyrene (PS), polyvinyl chloride (PVC), polylactic acid (PLA) or polyethylene terephthalate (PET).

As used herein and unless otherwise stated, "polyethylene" encompasses high density polyethylene (HDPE), low density polyethylene (LDPE), linear low density polyethylene (LLDPE), and ultra low density polyethylene (ULDPE). As used herein and unless otherwise stated, "polypropylene" encompasses homopolymer polypropylene, random copolymer polypropylene, and block copolymer polypropylene. In one embodiment, the plastic resin material is high density polyethylene (HDPE). The plastic materials may be made from petrochemical-sourced monomers or bio-sourced monomers.

Therefore, there is a need for a new process for manufacturing an extrusion blow molded container (205) with a recessed neck (208) and a closure attachment mechanism (209) that attaches to, or is integral with, the outside of a container's neck (208). De-molding such a recessed article may be achieved by a process utilizing moving mold inserts (207). The advantage of such process is that complex recess geometries generating undercuts may be formed directly by blowing. The portions of the mold that would normally be trapped by said undercuts during mold opening, are divided into a plurality of such mold inserts (207) and displaced in one or more phases, following the forming step, until clearance is provided and the formed article can be removed by simple opening of the mold.

Figure 1B:
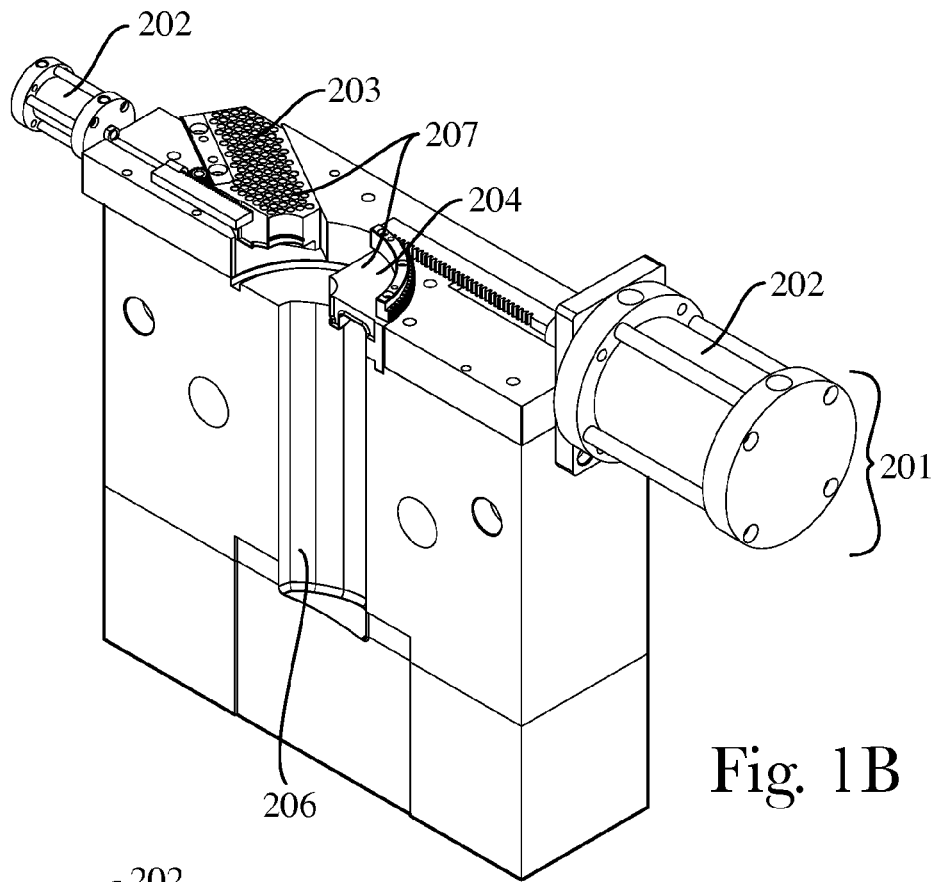
FIG. 1B is an isometric view of a mold used to form a container. This illustration shows the mold with a lateral or first phase insert actuated and a rotating or second phase insert still in a molding position, prior to being actuated.
Figure 1C:
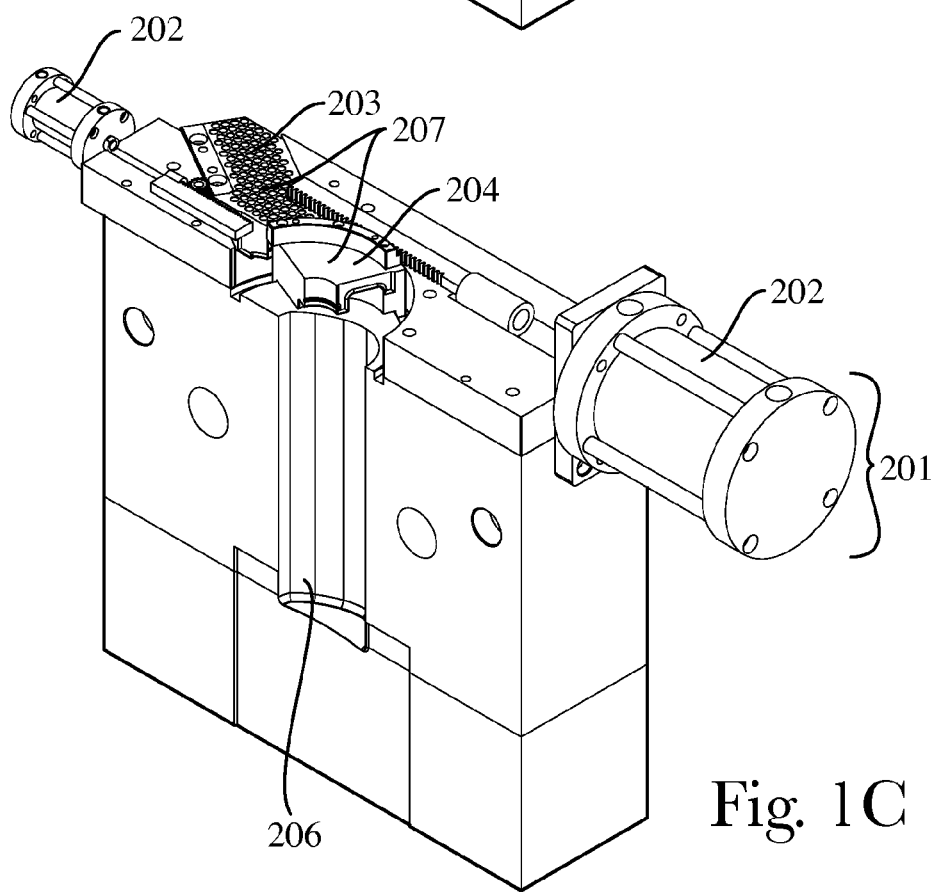
FIG. 1C is an isometric view of a mold used to form a container. This illustration shows a mold with both a lateral or first phase insert and a rotating or second phase insert actuated.
Figure 2A:
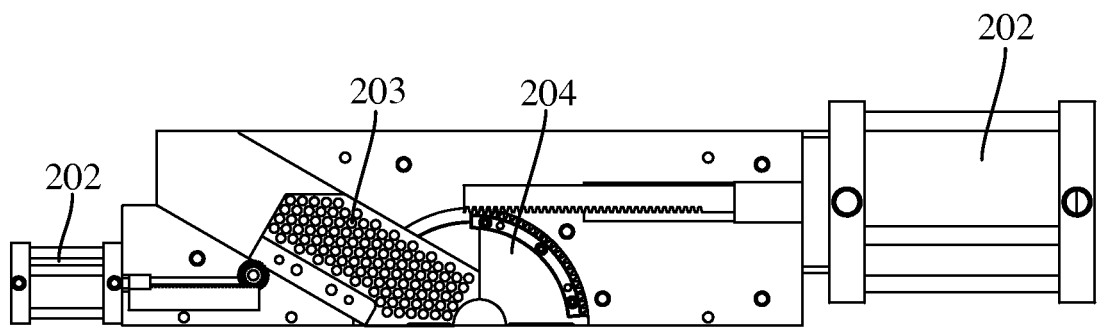
FIG. 2A is a top view of a mold used to form a container. This illustration shows two moving inserts in a molding position, prior to being actuated.
Figure 2B:
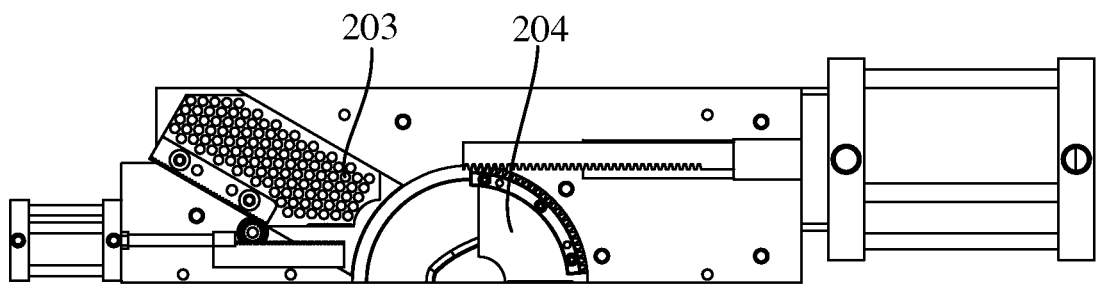
FIG. 2B is a top view of a mold used to form a container. This illustration shows a mold with a lateral or first phase insert actuated and a rotating or second phase insert still in a molding position, prior to being actuated.
Figure 2C:
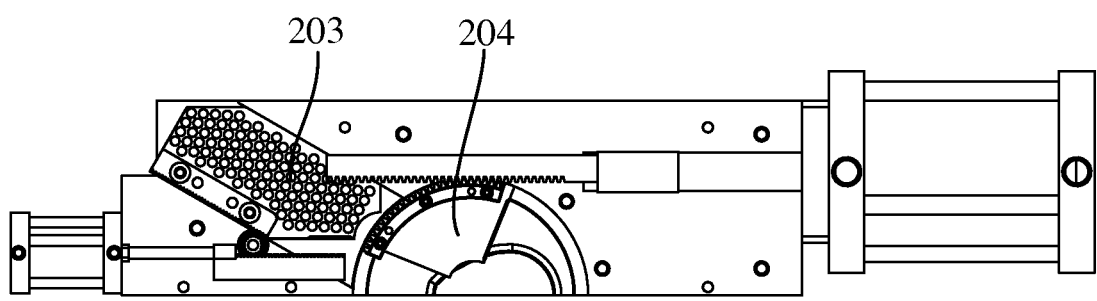
FIG. 2C is a top view of a mold used to form a container. This illustration shows a mold with both a lateral or first phase insert and a rotating or second phase insert actuated.
Figure 3A:
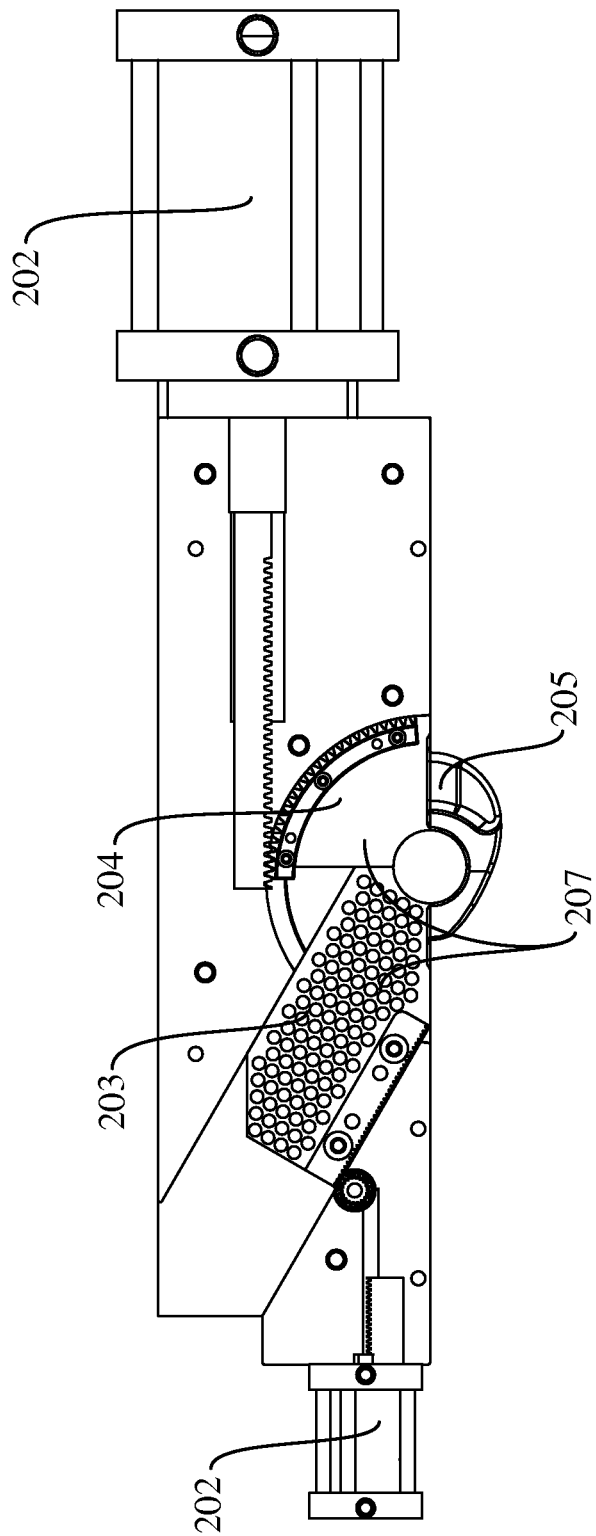
FIG. 3A is a top view of a mold used to form a container. This illustration shows a container inside a mold, prior to being released. The illustration also shows two moving inserts in a molding position, prior to being actuated.

Referring to FIGS. 1A-1C, 2A-2C, and 3A, the process according to the abovementioned embodiment may comprise the steps of:
  (i) Blowing an article, preferably a container (205) in a mold cavity (206);
  (ii) Displacing of lateral pull section inserts (203) or first phase actuation inserts in a first phase actuation providing clearance for rotating inserts (204) or second phase actuation inserts in subsequent phase(s) motions;
  (iii) Displacing of rotating inserts (204) or second phase actuation inserts in at least one second phase motion to finally provide clearance for the undercut features enabling the mold (201) to be opened and finished article to be ejected; and
  (iv) Opening of mold (201) for ejecting the finished article.
  (v) Preferably, said rotating inserts (204) or second phase actuation inserts are moved to return their starting position and subsequently said lateral pull section inserts (203) or first phase actuation inserts also return to their starting position, and optionally, the process cycle is repeated.

In step (ii) the lateral pull section inserts (203) may actuate in a linear motion to make space for the rotating inserts' (204) next movement. The lateral pull section inserts (203) may move in a direction which is different from the direction in which the mold is opened. The first phase actuation may be linear in motion and may retract the lateral pull section inserts (203). In one embodiment, the mold may be divided in at least two parts to enable opening along a mold parting line, preferably at least two parts are symmetric and each form one half of the mold. Preferably a lateral pull section insert (203) is retracted on each half of the mold. Said lateral pull section inserts (203) may each serve the function of forming one quadrant of the neck (208) portion and closure attachment mechanism (209) of the article. The space created in the mold adjacent to the article by said first movement may allow clearance for the rotating inserts (204) to be moved.

Without being bound by theory it is believed that having a single set of two moving inserts (207) to clear the undercut regions is undesirable. Indeed, using a single set of moving inserts (207) would result in each said moving inserts (207) generating a semi-circle or 180 degree arc around and proximal to the neck (208) portion. Any rotation of a moving insert (207) generating an arc of 180 degrees would cause collision at the mold parting line with the mold in its closed position. On the other hand in order to avoid such collision, it is preferred to have more than two moving inserts (207) of which at least two are rotating inserts (204), each generating an arc of less than 180 degrees, preferably less than or equal to 90 degrees. In one embodiment the rotating insert (204) comprises a concave shape on at least one of the rotating insert's (204) surface. Preferably, the angle of rotation ($A_r$) does not exceed the difference of 180 degrees and the angle formed by the at least one surface of the rotating insert ($A_s$) facing the neck portion. More preferably, the angle of rotation ($A_r$) is greater or equal to the angle formed by the at least one surface of the rotating insert ($A_s$) facing the neck portion. Most preferably the angle of rotation ($A_r$) satisfies the following formula (I):

$$A_s \leq A_r \leq (180° - A_s) \qquad (I)$$

In a preferred embodiment the total number of moving inserts (207) is four and present a 180 degree concave portion bisected into two 90 degree portions equally split between the mold halves. Preferably, two sets of two symmetrically opposite or mirrored moving inserts (207) on each mold half. The concave feature of the moving inserts (207) may partially surround the neck (208) portion and the at least one closure retention mechanism (209). In a more preferred embodiment said two sets of moving inserts (207) comprise one set of lateral pull section inserts (203) and one set of rotating inserts (204).

Step (iii) may comprise the step of displacing said rotating inserts (204) by eccentric rotation versus the opening formed proximal to said neck (208) portion to clear the undercuts caused by the shoulder(s) (210) design and the closure retention mechanism (209). The rotating inserts' (204) axes of rotation may be positioned to enable an eccentric movement relative to the article's neck (208) portion diameter. If the axes were collinear with the centerline of the neck (208) portion, the rotating inserts (204) may remain in contact with a surface of the neck (208) portion throughout the rotation, possibly causing a shearing or scraping of the formed article (205). Offsetting the rotation axes from the neck (208) portion diameter axis may allow for a gradual release and clearance between the neck (208) portion and the associated rotating insert (204) profile, thus eliminating any risk of scraping or shearing of the molded surfaces. Removal of the molded article may then be achieved by utilizing conventional mold opening action once said rotating inserts (204) have cleared the undercut regions.

Step (v) allows the rotating inserts (204) to return to their original molding position, clearing the space for the lateral pull inserts (203) to return to their original location. This operation may allow the completion of the outline of the article to be molded. Following these steps, the mold is ready to blow mold the next article, re-starting the process cycle.

To reduce the amount of space needed to fit the air cylinder (202) components, which are needed in the case of pneumatic pressure being used to actuate the moving inserts, these could be integrated into the mold design. Alternatively, but not limited to, hydraulic or electro-mechanical actuation may be used.

Non-limiting examples of processes and equipment that can be used to create said container (205) include shuttle (intermittent or continuous extrusion of parison), wheel, or other types of extrusion blow molding platform. The parts blown via these processes usually have better controlled geometry on the outside of the part rather than the inside, as the material wall thickness can vary due to part aspect ratios translating into differing parison stretch ratios in both radial and axial directions. Some of the benefits of using the extrusion blow molding process include being able to integrate handles into the design and relatively low tooling cost investment.

In an embodiment of the present invention, the first phase actuation motion of step (ii) is in a motion selected from the non-limiting group consisting of linear, rotating, curved, elliptical, multi-axis and mixtures thereof to provide a space for the subsequent phase inserts' next movement.

In an embodiment of the present invention, actuation of subsequent phase inserts of step (iii) is in a motion selected from the non-limiting group consisting of linear, rotating, curved, elliptical, multi-axis or mixtures thereof in a direction relative to a molded feature(s) selected from the non-limiting group consisting of linear, axial, radial, co-radial, eccentric, concentric, spiral and mixtures thereof to clear undercuts caused by a container's geometry and neck finish feature selected from the non-limiting group consisting of a snap bead, thread, bayonet and mixtures thereof.

In an embodiment of the present invention, movable inserts (207) of step (v) may return to a molding and pinching position wherein the shape of the container (205) to be molded is completed.

In an embodiment of the present invention, an article made by the process of the present invention may be selected from the non-limiting group consisting of containers, devices, handles, implements and mixtures thereof. Preferred articles are containers for use in a variety of fields. Non-limiting examples of such fields are; beauty care products, such as containers for body wash, shampoos and conditioners; domestic and/or household products, such as containers for detergents or other cleaning preparations for cleaning and/or conditioning fabric and/or hard surfaces; oral care products, such as containers for mouth wash; and so on.

In a further embodiment, a container (205) is made by the process of the present invention. In an even further embodiment, a container (205) made by the process of the present invention comprises two standing surfaces in a container geometry. With this geometry, the molded article can be placed in multiple orientations, such as upright or inverted orientation. This geometry further provides for a non-protruding closure for the molded article. The present invention may provide an article shoulder (210) that is concave and matches with the geometry of the closure so that there is a reduced gap left where product or water could accumulate. Additionally, when such a gap exceeds a 7.4 mm distance from the closure, the consumer perceives an internal barrier for product flow.

In an embodiment of the present invention, the process for the manufacture of a blow container may have a physical geometry that creates at least one non-linear or more than one linear undercut. In an embodiment, a linear undercut may have a portion of the surface geometry such that the surface is within the same plane. In an embodiment of the present invention, a non-linear undercut can be defined by a portion of the surface geometry such that the surface exists in multiple planes.

In an embodiment of the present invention, a container (205) made by the present invention wherein the container (205) is comprised of a biodegradable polymer or mixture of biodegradable polymers. In a further embodiment of the present invention, a container (205) made by the present invention wherein the container (205) is comprised of a biodegradable polymer material selected from the non-limiting group consisting of polylactic acid (PLA), polyglycolic acid (PGA), polybutylene succinate (PBS), an aliphatic-aromatic copolyester based on terephthalic acid, an aromatic copolyester with a high terephthalic acid content, polyhydroxylkanoate (PHA), thermoplastic starch (TPS), cellulose, or a mixture thereof.

In a different embodiment of the present invention, an injection blow molding process can be used to form a similar container. Injection blow molding is a manufacturing process used to create hollow containers where the thermoplastic material is first injected into a preform shape using an injection molding process. Subsequently, the preform is blown into a final container shape as a separate manufacturing step. Depending on how soon after being injected the preform is blown and the desired temperature profile for the preform, the preform may or may not go through a reheating process prior to being blown into its final shape. The reheat process heats the preform to above the resin's glass transition temperature. The preform is then blown using high pressure air into its final container shape. If the injection stretch blow molding process is used (ISBM), the preform will be stretched in the axial and hoop directions before the final blowing process. The main benefits obtained from this bi-axial orientation are an increase in material strength and improved barrier properties and clarity of the container.

In a different embodiment of the present invention, a process for the manufacture of an injection blow molded container with a recessed neck comprises the steps of:
(i) mold set in an open position with movable inserts in a molding position;
(ii) transferring of a preform into a blow molding mold;
(iii) closing the mold;
(iv) engaging of blow air;
(v) holding until end of blow air cycle;
(vi) first phase actuation of movable inserts providing clearance for subsequent phase(s) motions;
(vii) subsequent phase(s) movable inserts actuation (s), finally providing clearance for container's undercut details to be removed from mold;
(viii) opening of mold for part removal;
(ix) movement of inserts to return to molding position;
(x) re-starting of a cycle.

In yet a different embodiment of the present invention, a process for the manufacture of an injection stretch blow mold container with a recessed neck comprises the steps of:
(i) mold set in an open position with movable inserts in a molding position;
(ii) transferring a preform into a blow molding mold;
(iii) closing blow mold;
(iv) engaging of a stretch rod and blow air;
(v) holding until end of blow air cycle;
(vi) first phase actuation of movable inserts providing clearance for subsequent phase(s) motions;
(vii) subsequent phase(s) movable inserts actuation (s), finally providing clearance for container's undercut details to be removed from mold;
(viii) opening of mold for part removal;
(ix) moving inserts to return to molding position;
(x) re-starting of a cycle.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for the manufacture of an extrusion blow molded container with a recessed neck comprising the steps of:
   a) extruding a parison from a die;
   b) mold set in an open position with movable inserts in molding and pinching position;
   c) mold moving to capture the parison;
   d) mold engaging of blow air mechanism;
   e) mold holding until end of blow air cycle;
   f) first phase actuation of movable inserts providing clearance for subsequent phase(s) motions;
   g) subsequent phase(s) movable inserts actuation(s), finally providing a clearance for a container's undercut features to be removed from mold wherein a physical geometry creates more than one undercut;
   h) opening of mold for part removal;
   i) movement of inserts to return to a molding and pinching position;
   j) re-starting of a cycle,
      wherein at least one actuation is in a motion of rotating, curved, elliptical, multi-axis and mixtures thereof.

2. A process according to claim 1 wherein actuation of subsequent phase inserts of step g is in a motion selected from the group consisting of linear, rotating, curved, elliptical, multi-axis or mixtures thereof in a direction relative to a molded feature(s) selected from the group consisting of linear, axial, radial, co-radial, eccentric, concentric, spiral and mixtures thereof to clear undercuts caused by a container's geometry and a neck finish feature selected from the group consisting of a snap bead, thread, bayonet and mixtures thereof.

3. A process according to claim 1 wherein movable inserts of step i return to a molding and pinching position wherein the shape of the container to be molded is completed.

4. A process according to claim 1 wherein movable inserts of step i return to a molding and pinching position wherein the shape of the container to be molded is completed.

5. A process for the manufacture of an injection blow molded container with a recessed neck comprising the steps of:
   a) mold set in an open position with movable inserts in molding position;
   b) transferring a preform into a blow molding mold;
   c) closing the blow mold
   d) engaging of blow air;
   e) holding until end of blow air cycle;
   f) first phase actuation of movable inserts providing clearance for subsequent phase(s) motions;
   g) subsequent phase(s) movable inserts actuation(s), finally providing clearance for container's undercut details to be removed from mold wherein a physical geometry creates more than one undercut;
   h) opening of mold for part removal;
   i) moving inserts to return to molding position;
   j) re-starting of a cycle
wherein at least one actuation is in a motion of rotating, curved, elliptical, multi-axis and mixtures thereof.

6. A process for the manufacture of an injection stretch blow molded container with a recessed neck comprising the steps of:
   a) mold set in an open position with movable inserts in molding position;
   b) transferring a preform into a blow molding mold;
   c) close mold;
   d) engaging of a stretch rod and blow air;
   e) holding until end of blow air cycle;
   f) first phase actuation of movable inserts providing clearance for subsequent phase(s) motions;
   g) subsequent phase(s) movable inserts actuation(s), finally providing clearance for container's undercut details to be removed from mold wherein a physical geometry creates more than one undercut;
   h) opening of mold for part removal;
   i) moving inserts to return to molding position;
   j) re-starting of a cycle
wherein at least one actuation is in a motion of rotating, curved, elliptical, multi-axis and mixtures thereof.

* * * * *